(12) United States Patent
Conner et al.

(10) Patent No.: US 6,826,459 B2
(45) Date of Patent: Nov. 30, 2004

(54) GROUND PROXIMITY WARNING SYSTEM, METHOD AND COMPUTER PROGRAM PRODUCT FOR CONTROLLABLY ALTERING THE BASE WIDTH OF AN ALERT ENVELOPE

(75) Inventors: Kevin J. Conner, Kent, WA (US); Steven C. Johnson, Issaquah, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/231,886

(22) Filed: Aug. 30, 2002

(65) Prior Publication Data

US 2003/0036828 A1 Feb. 20, 2003

Related U.S. Application Data

(62) Division of application No. 09/496,297, filed on Feb. 1, 2000, now Pat. No. 6,484,071.
(60) Provisional application No. 60/118,219, filed on Feb. 1, 1999.

(51) Int. Cl.$^7$ .............................. G06F 19/00; G06F 7/00
(52) U.S. Cl. ...................... 701/9; 701/301; 342/357.06; 340/963
(58) Field of Search ............................... 701/9, 301, 8, 701/4, 1–3; 342/357.13, 357.06, 358, 26; 340/970, 945, 961, 963, 972; 240/180, 181

(56) References Cited

U.S. PATENT DOCUMENTS

| | | | |
|---|---|---|---|
| 3,715,718 A | 2/1973 | Astengo ...................... 340/970 |
| 3,925,751 A | 12/1975 | Bateman et al. ............. 340/967 |
| 3,934,221 A | 1/1976 | Bateman et al. ............. 340/970 |
| 3,934,222 A | 1/1976 | Bateman et al. ............. 340/970 |
| 3,936,796 A | 2/1976 | Bateman et al. ............. 340/970 |
| 3,944,968 A | 3/1976 | Bateman et al. ............. 340/970 |
| 3,947,808 A | 3/1976 | Bateman ...................... 340/970 |
| 3,947,810 A | 3/1976 | Bateman et al. ............. 340/970 |
| 3,958,218 A | 5/1976 | Bateman ...................... 340/970 |
| 3,958,219 A | 5/1976 | Bateman ...................... 340/970 |
| 4,016,565 A * | 4/1977 | Walker ...................... 343/7 TA |
| 4,027,307 A * | 5/1977 | Litchford ............... 343/6.5 LC |
| 4,030,065 A | 6/1977 | Bateman ...................... 340/970 |
| 4,060,793 A | 11/1977 | Bateman ...................... 340/970 |
| 4,063,073 A | 12/1977 | Strayer ....................... 364/439 |
| 4,196,434 A * | 4/1980 | Funatsu et al. ........... 343/6.5 R |
| 4,215,334 A | 7/1980 | Bateman ...................... 340/970 |
| 4,224,669 A | 9/1980 | Brame ......................... 364/433 |
| 4,319,218 A | 3/1982 | Bateman ...................... 340/970 |
| 4,380,050 A * | 4/1983 | Tanner ........................ 364/461 |
| 4,484,192 A | 11/1984 | Seitz et al. ................. 340/995 |
| 4,567,483 A | 1/1986 | Bateman et al. ............. 340/970 |
| 4,642,775 A | 2/1987 | Cline et al. ................. 364/443 |
| 4,646,244 A | 2/1987 | Bateman et al. ............. 364/461 |

(List continued on next page.)

Primary Examiner—Thomas G. Black
Assistant Examiner—Ronnie Mancho
(74) Attorney, Agent, or Firm—Black Lowe & Graham PLLC

(57) ABSTRACT

A ground proximity warning system, method and computer program product are provided that controllably alter the base width of the alert envelope in order to accommodate uncertainties associated with the current position of the aircraft. In one embodiment, the ground proximity warning system, method and computer program product controllably alter the base width of the alert envelope depending upon an error value, i.e., an uncertainty, associated with the current position of the aircraft. Since the error value associated with the current position of the aircraft is largely dependent upon the type of navigation equipment onboard the aircraft, the ground proximity warning system, method and computer program product of another embodiment controllably alter the base width of the alert envelope depending upon the type of navigation equipment that provides the current position of the aircraft.

6 Claims, 4 Drawing Sheets

U.S. PATENT DOCUMENTS

| | | | | |
|---|---|---|---|---|
| 4,675,823 A | | 6/1987 | Noland | 364/460 |
| 4,729,737 A | * | 3/1988 | Reagan et al. | 434/35 |
| 4,835,537 A | | 5/1989 | Manion | 340/961 |
| 4,894,655 A | | 1/1990 | Joguet et al. | 340/988 |
| 4,903,212 A | | 2/1990 | Yokouchi et al. | 364/449.95 |
| 4,912,645 A | | 3/1990 | Kakihara et al. | 364/449.2 |
| 4,914,436 A | | 4/1990 | Bateman et al. | 340/970 |
| 4,914,733 A | | 4/1990 | Gralnick | 340/961 |
| 4,916,448 A | | 4/1990 | Thor | 340/970 |
| 4,924,401 A | * | 5/1990 | Bice et al. | 701/6 |
| 4,947,164 A | | 8/1990 | Bateman | 340/968 |
| 4,954,959 A | | 9/1990 | Moroto et al. | 364/449.5 |
| 4,987,413 A | * | 1/1991 | Grove | 340/970 |
| 5,086,396 A | | 2/1992 | Waruszewski, Jr. | 364/454 |
| 5,136,512 A | | 8/1992 | Le Borne | 364/461 |
| 5,140,532 A | | 8/1992 | Beckwith, Jr. et al. | 395/101 |
| 5,153,588 A | | 10/1992 | Muller | 340/968 |
| 5,155,688 A | | 10/1992 | Tanaka et al. | 364/454 |
| 5,157,615 A | | 10/1992 | Brodegard | 364/461 |
| 5,196,847 A | | 3/1993 | Bateman | 340/970 |
| 5,202,690 A | | 4/1993 | Frederick | 342/26 |
| 5,220,322 A | * | 6/1993 | Bateman et al. | 340/970 |
| 5,252,978 A | | 10/1993 | Priestley | 342/29 |
| 5,257,195 A | | 10/1993 | Hirata | 364/449.95 |
| 5,265,025 A | | 11/1993 | Hirata | 364/449.7 |
| 5,285,391 A | | 2/1994 | Smith, Jr. et al. | 364/443 |
| 5,293,163 A | | 3/1994 | Kakihara et al. | 340/995 |
| 5,293,318 A | | 3/1994 | Fukushima | 364/449.95 |
| 5,333,317 A | * | 7/1994 | Dann | 707/5 |
| 5,337,242 A | | 8/1994 | Yamamoto et al. | 364/449.2 |
| 5,414,631 A | | 5/1995 | Denoize et al. | 364/461 |
| 5,442,556 A | | 8/1995 | Boyes et al. | 364/461 |
| 5,486,821 A | | 1/1996 | Stevens et al. | 340/970 |
| 5,488,563 A | * | 1/1996 | Chazelle et al. | 701/301 |
| 5,495,249 A | | 2/1996 | Chazelle et al. | 342/36 |
| 5,519,392 A | | 5/1996 | Oder et al. | 340/995 |
| 5,526,000 A | | 6/1996 | Chazelle et al. | 342/407 |
| 5,581,259 A | | 12/1996 | Schipper | 342/451 |
| 5,608,392 A | | 3/1997 | Faivre et al. | 340/967 |
| 5,638,282 A | | 6/1997 | Chazelle et al. | 364/461 |
| 5,661,486 A | | 8/1997 | Faivre et al. | 342/33 |
| 5,677,842 A | | 10/1997 | Denoize et al. | 364/461 |
| 5,798,712 A | | 8/1998 | Coquin | 340/970 |
| 5,839,080 A | * | 11/1998 | Muller et al. | 701/9 |
| 5,933,099 A | * | 8/1999 | Mahon | 340/961 |
| 5,936,552 A | * | 8/1999 | Wichgers et al. | 340/963 |
| 6,216,064 B1 | * | 4/2001 | Johnson et al. | 701/4 |
| 6,243,482 B1 | * | 6/2001 | Eibert et al. | 382/103 |
| 6,466,702 B1 | * | 10/2002 | Atkins et al. | 382/300 |

\* cited by examiner (Prior Art)

GROUND PROXIMITY WARNING SYSTEM, METHOD AND COMPUTER PROGRAM PRODUCT FOR CONTROLLABLY ALTERING THE BASE WIDTH OF AN ALERT ENVELOPE

RELATED APPLICATIONS

The present application is a division of U.S. patent application Ser. No. 09/496,297 filed Feb. 1, 2000, now U.S. Pat. No. 6,484,071 which in turn claims priority from U.S. Provisional Application Ser. No. 60/118,219 entitled EGPWS Trident Width Expansion filed Feb. 1, 1999, the contents of which are incorporated herein by reference.

FIELD OF THE INVENTION

The present invention relates generally to ground proximity warning systems and methods for use in aircraft and marine applications and, more particularly, to ground proximity warning systems, methods and computer program products for controllably altering the base width of an alert envelope to account for uncertainties associated with the position of the aircraft or ship.

BACKGROUND OF THE INVENTION

An important advancement in aircraft flight safety has been the development of ground proximity warning systems. These warning systems analyze the flight parameters of the aircraft and the terrain surrounding the aircraft. Based on this analysis, these warning systems provide alerts to the flight crew concerning possible inadvertent collisions of the aircraft with surrounding terrain or other obstacles.

Although these warning systems are quite useful in providing the flight crew with information concerning potential problems with the navigation of the aircraft, the usefulness of these systems must be balanced against problems associated with the generation of nuisance alarms. Specifically, although it is advantageous to provide the flight crew with as much information as possible concerning terrain and obstacles in the flight path of the aircraft, this information should be delivered to the flight crew in a timely manner, such that the flight crew will pay close attention to the information. If alarms are provided too far in advance to the flight crew concerning terrain that is still far away from the present position of the aircraft, the flight crew may become desensitized to the alarms and may potentially ignore alarms from the ground proximity warning system altogether. Further, the generation of alarms concerning terrain that is still far away from the present position of the aircraft may also add stress and confusion on the flight crew and may overshadow other more critical alarms in the cockpit.

For this reason, at least one ground proximity warning system defines an alert envelope and, more particularly, both a caution envelope and a warning envelope. The imaginary alert envelope moves with the aircraft and is constructed to extend generally forwardly of the aircraft and to define a region in which alerts will be generated if terrain or other obstacles enter by penetrating the alert envelope. In this regard, U.S. Pat. No. 5,839,080 to Hans R. Muller, et al. and assigned to AlliedSignal, Inc. describes an advantageous ground proximity warning system that generates an alert envelope. The contents of U.S. Pat. No. 5,839,080 are hereby incorporated by reference in their entirety.

As described by U.S. Pat. No. 5,839,080 and depicted in FIGS. 1 and 2, an alert envelope is defined by a number of parameters, including a look ahead distance (LAD), a base width (DOFF), and a terrain floor (ΔH). In general terms, the look ahead distance defines the distance in advance of the aircraft that the alert envelope extends. Similarly, the terrain floor typically defines a vertical distance below the aircraft, which is utilized during the construction of the floor of the alert envelope. Further, the base width is the lateral width of the alert envelope at a location proximate the aircraft. In one example, the base width of an alert envelope extends laterally 0.125 nautical miles to each side of the aircrafl for a total base width of 0.25 nautical miles with the aircraft centered relative to the base width.

While the base width may be a constant value, at least one ground proximity warning system reduces the base width as the aircraft nears an intended runway on which the aircraft will land. By way of example, this ground proximity warning system reduces the base width in a linear manner from a maximum of 0.25 nautical miles to a minimum of 0.04 nautical miles as the aircraft goes from 4 nautical miles from the intended runway to 2 nautical miles from the intended runway. By reducing the base width of the alert envelope, the ground proximity warning system reduces the overall size of the alert envelope and therefore requires the terrain or other obstacles to be closer to the aircraft, at least in a lateral direction, prior to generating an alert. Since an aircraft that is approaching a runway for a landing may be positioned more closely to terrain or other obstacles as the aircraft follows the desired glideslope than while enroute, the reduction in the base width of the alert envelope reduces the generation of disconcerting nuisance alerts during the landing phase, while still providing alerts for terrain or other obstacles that are actually in the flight path of the aircraft.

As shown in FIG. 2, an alert envelope is therefore at least partially defined by a center tine 10 and a pair of outer tines 12. During relatively level flight in which the absolute value of the roll angle of the aircraft is a relatively small value, such as less than 5°, the center tine points along the ground track of the aircraft. In instances in which the aircraft has a larger roll angle, such as greater than 5°, the center tine is angularly displaced from the ground track by an angle approximating the roll angle to thereby incorporate a lead angle during turning of the aircraft. In either situation, the outer tines generally diverge from the center tine by a predetermined angle. Thus, the alert envelope is somewhat broader for locations in advance of the aircraft than at the current position of the aircraft. As shown in FIG. 2, the spacing between the outer tines at a location proximate the current position of the aircraft is defined by the base width, such as 0.25 nautical miles in one example, and the outer tines diverge from the center tine at a predetermined angle, such as 3°, in advance of the aircraft.

As described by U.S. Pat. No. 5,839,080, the ground proximity warning system can construct a pair of alert envelopes, namely, a caution envelope and a warning envelope. While each envelope has a similar shape as described above and depicted in FIGS. 1 and 2, the caution envelope typically extends further ahead of the aircraft than the warning envelope and is therefore larger than the warning envelope. Accordingly, the ground proximity warning system will generate cautionary alerts in instances in which the upcoming terrain or other obstacles penetrate the caution envelope, but not the warning envelope. Once the upcoming terrain or other obstacles penetrate the warning envelope, however, the ground proximity warning system will generate a more severe warning alert. As such, a pilot can discern the severity of the alert and the rapidity with which evasive maneuvers must be taken in order to avoid the upcoming terrain or other obstacles based upon the type of alert that is provided, i.e., a cautionary alert or a more severe warning alert.

As will be apparent from FIG. 2 and from the foregoing description of the alert envelope generated by a ground proximity warning system, the alert envelope is at least partially dependent upon the current location of the aircraft. In this regard, the base width of the alert envelope is centered laterally relative to the current position of the aircraft and the base width, in turn, defines the origin of the outer tines of the alert envelope. Unfortunately, the current position of the aircraft cannot be determined with absolute certainty. Instead, the current position of the aircraft is always subject to at least some uncertainty.

The uncertainty associated with the determination of the current position of the aircraft depends upon a number of factors, including the type of navigation system utilized by the aircraft and, in some instances, the phase of the flight, i.e., final approach, terminal area, or enroute. For example, a global positioning satellite (GPS) system can determine the current position of the aircraft with very little uncertainty, irrespective of the phase of the flight. For example, one GPS system can determine the current position of the aircraft to within an uncertainty of 0.054 nautical miles irrespective of the phase of the flight.

Unfortunately, other navigation equipment cannot determine the current position of the aircraft as exactly. For example, a flight management system is another common type of navigation equipment that is capable of receiving input from a variety of other navigational instruments, such as inertial navigation instruments, radio navigational instruments including very high frequency omnidirectional radio range (VOR) systems, and GPS systems, and that generates position information therefrom. Depending upon the navigational instrument that provides input to the flight management system, the current position provided by the flight management system may have a rather substantial uncertainty with the uncertainty increasing as the aircraft is further from the intended runway, that is, the uncertainty for an aircraft enroute exceeds the uncertainty for an aircraft in the terminal area which, in turn, exceeds the uncertainty for an aircraft in final approach. In this regard, a flight management system that relies upon a VOR system for position information generally has the largest uncertainty with respect to the determination of the current position of the aircraft. For example, the AC 20-130 airworthiness approval of multi-sensor navigation systems for use in U.S. national airspace system (NAS) and Alaska defines 95% probability numbers for the uncertainty of a flight management system that relies upon a VOR system to be 2.8 nautical miles enroute, 1.7 nautical miles in the terminal area and either 0.3 or 0.5 nautical miles during final approach. With respect to the two uncertainty values that are provided for the final approach phase, the larger uncertainty is associated with a flight management system that only receives position information from a VOR system, while the smaller uncertainty value is associated with a flight management system that receives position information from a VOR system that works in conjunction with distance measuring equipment.

In instances in which the uncertainties associated with the determination of the current position of the aircraft are relatively large, the aircraft may not be centered laterally relative to the base width of the alert envelope, but may actually be positioned at a location offset from the center line 10 of the alert envelope. In these instances, it is possible that the alert provided by the ground proximity warning system may not provide the pilot of the aircraft with as much reaction time as desired to respond to the alert and take appropriate evasive action, especially if the aircraft is actually positioned nearer to the terrain or obstacle that penetrated the alert envelope then the current position of the aircraft would indicate. Accordingly, while ground proximity warning systems have proven to be a great advance in aircraft flight safety, it would be desirable to further refine the alert envelopes generated by ground proximity warning systems to accommodate uncertainties associated with the position of the aircraft.

SUMMARY OF THE INVENTION

The ground proximity warning system, method and computer program product of the present invention controllably alter the base width of the alert envelope in order to accommodate uncertainties associated with the current position of the aircraft. In one embodiment, the ground proximity warning system, method and computer program product controllably alter the base width of the alert envelope depending upon an error value, i.e., an uncertainty, associated with the current position of the aircraft. Since the error value associated with the current position of the aircraft is largely dependent upon the type of navigation equipment onboard the aircraft, the ground proximity warning system, method and computer program product of another embodiment controllably alter the base width of the alert envelope depending upon the type of navigation equipment that provides the current position of the aircraft. As such, the ground proximity warning system, method and computer program product define a more refined alert envelope that will provide a pilot with ample time to respond even if the current position of the aircraft is slightly errant.

According to the present invention, an alert envelope is generated, typically by a processor and/or computer readable program code means executed by the processor. The alert envelope defines an alert region extending at least forward of an aircraft. The alert envelope is based at least partially upon a base width proximate the current position of the aircraft and extending laterally relative to the aircraft. The alert envelope is also at least partially based upon a look-ahead distance that extends forward of the aircraft.

The ground proximity warning system, method and computer program product of one embodiment alters the base width of the alert envelope depending upon an error value associated with the current position of the aircraft. For example, the base width of the alert envelope is made smaller as the error value associated with the current position of the aircraft decreases. Conversely, the base width of the alert envelope is made larger as the error value associated with the current position of the aircraft increases. The ground proximity warning system, method and computer program product of this embodiment is also responsive to a terrain database having a plurality of different resolutions. For example, the terrain database typically has an increased resolution near airports and highly populated regions and a lower resolution for those regions remote from an airport or highly populated regions. As such, the ground proximity warning system, method and computer program product can also alter the base width of the alert envelope based upon the resolution of the terrain database at the current position of the aircraft. In one advantageous embodiment, for example, the base width of the alert envelope is altered to be at least as large as the difference between the error value associated with the current position of the aircraft and 50% of the resolution of the terrain database at the current position of the aircraft.

Typically, the error value associated with the current position of the aircraft is dependent upon the type of navigation equipment that provides the current position of the aircraft and the distance of the aircraft to the intended runway. As such, the ground proximity warning system, method and computer program product of one embodiment of the present invention alters the base width of the alert envelope depending upon the type of navigation equipment that provides the current position of the aircraft. In this regard, the base width of the alert envelope is typically larger if the current position of the aircraft is provided by a flight management system than if the current position of the aircraft is provided by a global positioning system. Due to the relatively small uncertainty associated with the position determination of a global positioning system, the base width of the alert envelope can be limited to a predetermined maximum value in instances in which a global positioning system is providing the current position of the aircraft. Since the error or uncertainty associated with the position determination provided by navigation equipment such as a flight management system can be at least partially dependent upon the phase of flight, the ground proximity warning system, method and computer program product can also alter the base width of the alert envelope based upon the distance of the aircraft from the intended runway.

Therefore, the ground proximity warning system, method and computer program product of the present invention controllably alter the base width of the alert envelope in order to compensate for errors associated with the current position of the aircraft, such as the errors that are dependent upon the type of navigation equipment that provides the current position of the aircraft and/or the distance of the aircraft to the intended runway. In addition, the ground proximity warning system, method and computer program product of one embodiment of the present invention also alter the base width of the alert envelope based upon the resolution of the terrain database at the current position of the aircraft. Accordingly, the ground proximity warning system, method and computer program product ensure that alerts provided by the ground proximity warning system in response to terrain or other obstacles penetrating the alert envelope are provided far in advance of the terrain or other obstacles such that the pilot has a sufficient opportunity to assess the situation and take proper evasive action, even in instances in which the aircraft is actually displaced from the current position identified by the navigation equipment in a direction toward the upcoming terrain or other obstacles.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

According to the present invention, a ground proximity warning system 26, method and computer program product are provided that controllably alter the base width of an alert envelope in order to accommodate uncertainties associated with the current position of the aircraft. In one embodiment, a ground proximity warning system, method and computer program product controllably alter the base width of the alert envelope depending upon an error value associated with the current position of the aircraft. Since the error value associated with the current position of the aircraft is largely dependent upon the type of navigation equipment onboard the aircraft, the ground proximity warning system, method and computer program product of the present invention can also be described as controllably altering the base width of the alert envelope depending upon the type of navigation equipment that provides the current position of the aircraft. In any event, the ground proximity warning system, method and computer program product define a more sophisticated alert envelope than currently provided by existing ground proximity warning systems in order to provide a pilot with ample time to respond to upcoming terrain or other obstacles, even if the aircraft is actually closer to the upcoming terrain or other obstacles than the current position provided by the navigation equipment indicates.

For illustrative purposes, the ground proximity warning system 26, method and computer program product of the present invention are illustrated and described below in conjunction with the ground proximity warning system of U.S. Pat. No. 5,839,080 which has already been incorporated herein by reference. It should be apparent, however, that the ground proximity warning system, method and computer program product can be utilized either independently or in conjunction with other systems, if so desired.

Figure 3:
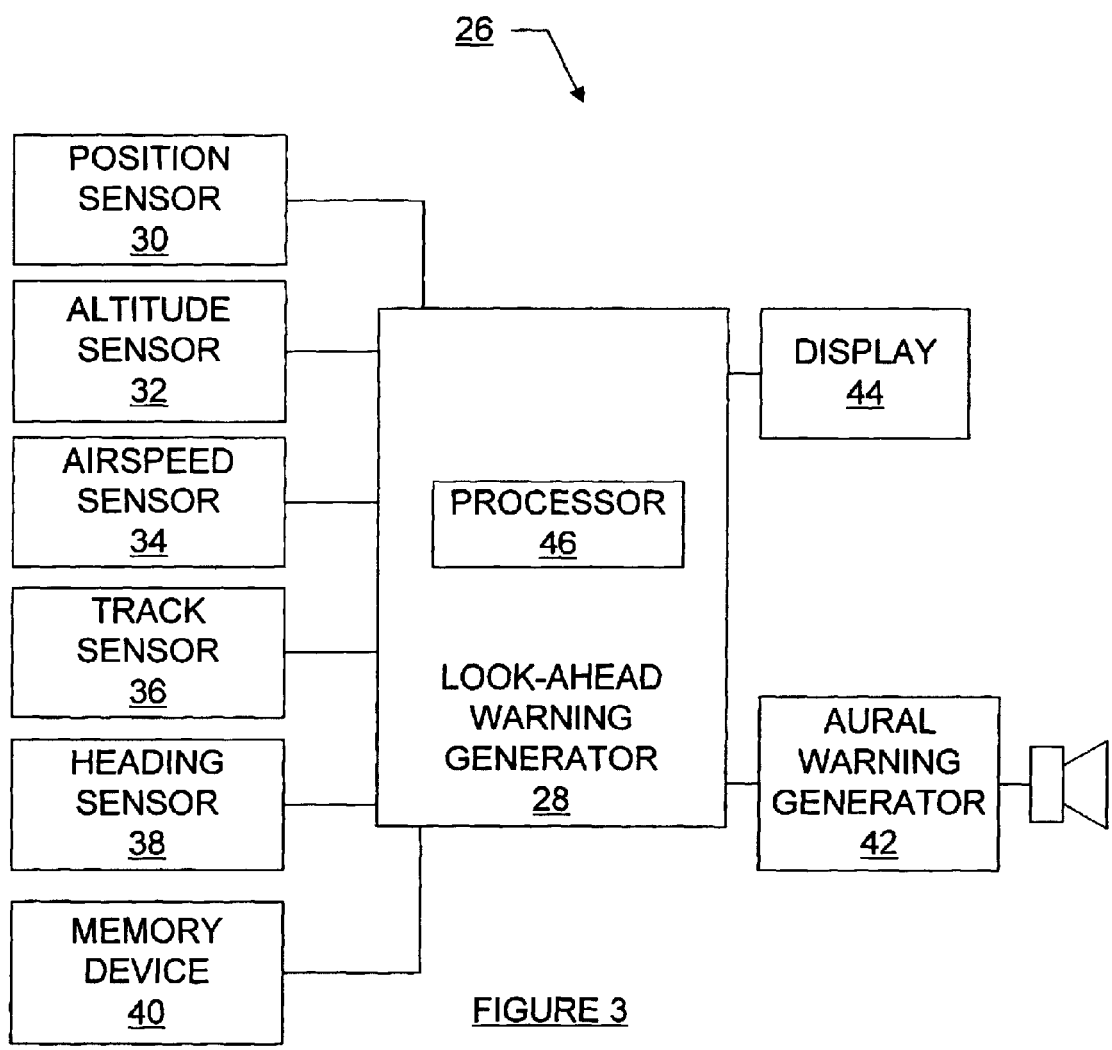
FIG. 3 is a block diagram of a ground proximity warning system according to one embodiment of the present invention.

FIG. 3 depicts many of the components of the ground proximity warning system of U.S. Pat. No. 5,839,080 in simplified block form for illustrative purposes, however, it is understood that the functions of these blocks are consistent with and contain many of the same components as the ground proximity warning system described in U.S. Pat. No. 5,839,080. The ground proximity warning system 26 includes a look-ahead warning generator 28 that will be described hereinafter in more detail that analyzes aircraft data and terrain caution and warning envelopes that extend forward of the aircraft and that move with the aircraft. Based on the terrain caution and warning envelopes, the look-ahead warning generator generates aural and/or visual warning alarms related to the proximity of the aircraft to the surrounding terrain or other obstacles. Some of the sensors that provide the look-ahead warning generator with data input concerning the aircraft are depicted. Specifically, the look-ahead warning generator receives positional data from a position sensor 30. The position sensor may be any one of a wide variety of navigational instruments including a global positioning system (GPS), an inertial navigation system (INS), or a flight management system (FMS). The look-ahead warning generator also receives altitude and airspeed data from an altitude sensor 32 and airspeed sensor 34, respectively. In addition, the look-ahead warning generator receives the aircraft track and heading information from a track sensor 36 and a heading sensor 38, respectively, which may also included within the INS and/or the FMS.

In addition to receiving data concerning the aircraft, the ground proximity warning system 26 also receives data concerning the terrain surrounding the aircraft. Specifically, the look-ahead warning generator 28 is also connected to a memory device 40 that contains a searchable data base of data relating, among other things, to the position and elevation of various terrain features and other obstacles and also elevation, position, and quality information concerning runways.

Figure 1:
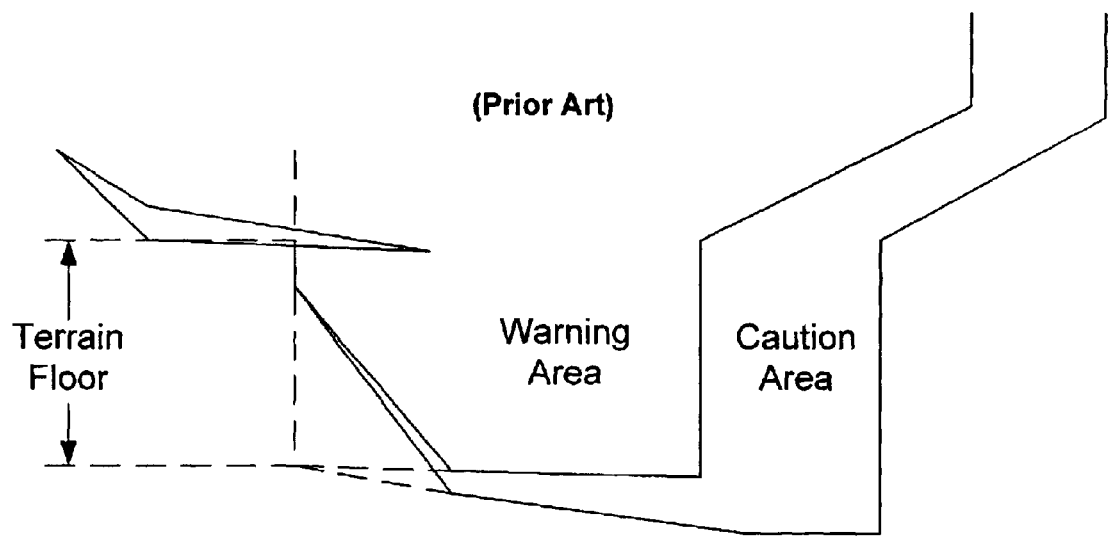
FIG. 1 is a schematic side view of the caution and warning envelopes generated by a ground proximity warning system method that illustrates the look ahead distances and the terrain floor, as in the prior art.

In normal operation, the look-ahead warning generator 28 receives data concerning the aircraft from the various sensors. Additionally, the look-ahead warning generator accesses terrain and airport information from the memory device 40 concerning the terrain surrounding the aircraft and a selected runway—typically the runway that is closest in proximity to the aircraft's current position or a determined or predicted runway, such as described by U.S. Pat. No. 6,304,800 entitled "Methods, Apparatus and Computer Program Products for Automated Runway Selection", the contents of which are incorporated herein by reference. Based on the current position, distance to the selected runway, altitude, speed, track, etc. of the aircraft, the look-ahead warning generator generates alert envelopes, namely, terrain caution and warning envelopes, as shown in FIG. 1. The look-ahead generator also generates alerts via either an aural warning generator 42 and/or a display 44 as to terrain or other obstacles that penetrate the terrain caution or warning envelopes.

As depicted in FIG. 3, the look ahead warning generator 28 can include a processor 46. Alternatively, the processor can be physically separated from, but electrically connected to the look-ahead warning generator. In either instance, it must be understood that the processor may consist of any number of devices. The processor may be a data processing device, such as a microprocessor or microcontroller or a central processing unit. The processor could be another logic device such as a DMA (Direct Memory Access) processor, an integrated communication processor device, a custom VLSI (Very Large Scale Integration) device or an ASIC (Application Specific Integrated Circuit) device. In addition, the processor can be any other type of analog or digital circuitry that is designed to perform the processing functions described hereinbelow.

Regardless of the embodiment, the processor 46 generates at least one alert envelope and, more typically, a caution envelope and a warning envelope that define alert regions extending at least forward of an aircraft. As shown in FIG. 1 and as described in more detail in U.S. Pat. No. 5,839,280, each alert envelope is defined by a number of parameters including a look ahead distance (LAD), a base width (DOFF) and a terrain floor ($\Delta H$). See also U.S. patent application Ser. No. 09/495,979 entitled "Apparatus, Methods and Computer Program Products for Determining a Look Ahead Distance Value for High Speed Flight" filed Feb. 1, 2000, for additional discussion of the LAD, the contents of this application are also incorporated by reference herein.

Figure 2:
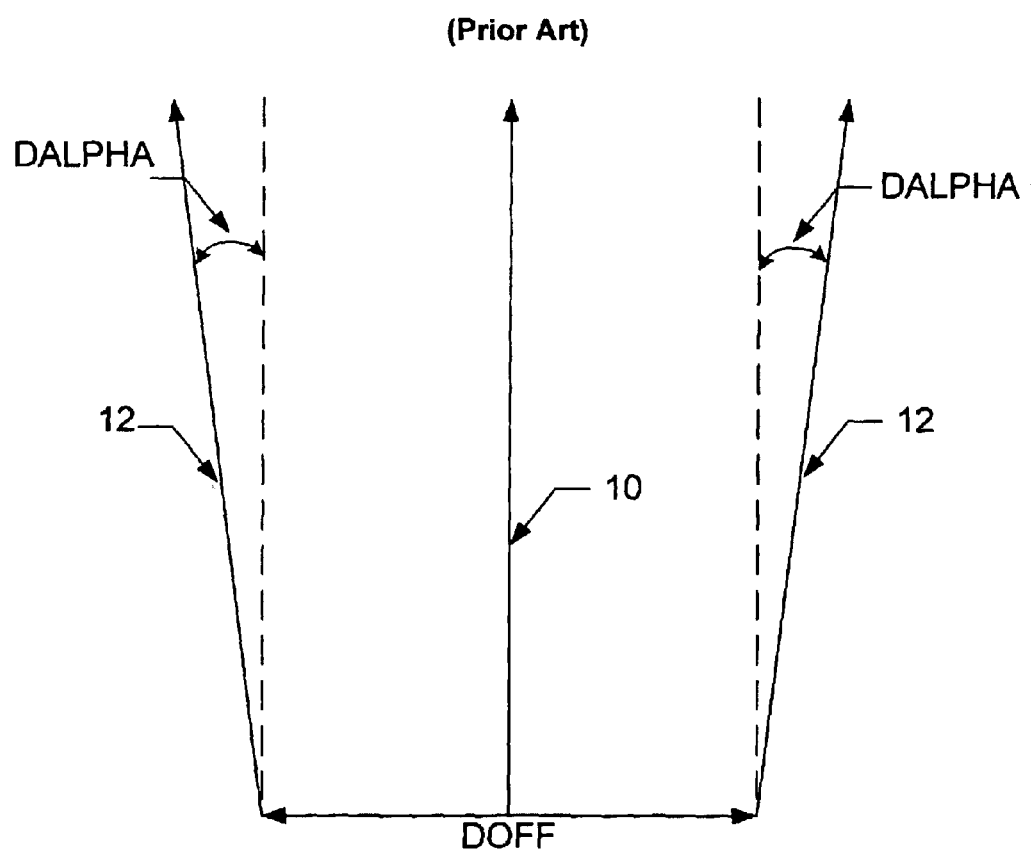
FIG. 2 is a schematic plan view of an alert envelope generated a ground proximity warning system and method that illustrates the base width, center tine and outer tines, as in the prior art.

As shown in FIG. 2 and as described in more detail below, each alert envelope is also at least partially defined by a center tine 10 and a pair of outer tines 12. During relatively level flight in which the absolute value of the roll angle is a relatively small value, such as less than 5 degrees, the center tine points along the ground track of the aircraft. In instances in which the navigation equipment, such as a position sensor 30, indicates that the absolute value of the roll angle is larger, such as greater than 5 degrees, the center tine is angularly displaced from the ground track by an angle derived from the roll angle to thereby add a lead angle during turning of the aircraft. In either situation, the look ahead warning generator 28 constructs the outer tines to generally diverge from the center tine by a predetermined angle DALPHA. In this regard, the look ahead warning generator generally constructs the alert envelopes such that the space between the outer tines at a location proximate the current position of the aircraft is defined by the base width and that the outer tines diverge from the center tine at a predetermined angle DALPHA, such as 3 degrees, in advance of the aircraft.

The base width of an alert envelope, either the caution envelope or the warning envelope, is defined proximate the current position of the aircraft and extends laterally relative to the aircraft. In this regard, the processor 46 generally defines the base width to extend in equal lateral distances on both sides of the aircraft. According to the present invention, the processor controllably alters the base width of the alert envelope depending upon an error value associated with the determination of the current position of the aircraft. In general terms, the processor alters the base width of the envelope to be smaller as the error value associated with the current position of the aircraft decreases and, conversely, increases the base width of alert envelope as the error value associated with the current position of the aircraft increases.

By controllably altering the base width of each alert envelope, the ground proximity warning system 26 and method of the present invention generates more specifically tailored alert envelopes while continuing to balance the need to provide ample time following an alert for a pilot to assess the situation and to take appropriate evasive maneuvers versus the desire to minimize nuisance alarms. As such, in instances in which the current position of the aircraft cannot be determined with great certainty, the base width of the alert envelope is generally increased such that even in instances in which the aircraft is displaced from the location identified as its current position, the ground proximity warning system and method of the present invention will still provide ample time for a pilot to assess the situation and to take appropriate evasive maneuvers following an alert. In contrast, in those situations in which the current position of the aircraft is relatively precisely defined, the ground proximity warning system and method of the present invention can reduce the base width of the alert envelopes which correspondingly reduces the overall size of the alert envelopes in order to reduce the number of nuisance alarms that would otherwise be generated.

The ground proximity warning system 26 and method of the present invention preferably controllably alter the base width of each alert envelope such that the base half width, i.e., that portion of the base width that extends laterally to one side of the current position of the aircraft, equals or exceeds the error value associated with the current position of the aircraft. In order to avoid generating an excess number nuisance alarms, the ground proximity warning system method of the present invention also preferably takes into account the resolution of the terrain database.

In this regard, the terrain database generally divides a region, such as the United States or each state of the United States, into a large number of sub-regions. For each sub-region, the terrain database defines the location of the sub-region and the maximum altitude of the terrain within the sub-region. While each sub-region can have the same size and shape, the sub-regions that include airports and/or highly populated locales are generally smaller so as to have increased resolution. For example, the sub-region near an airport and/or a highly populated locale generally has a square shape that is 0.5 nautical miles per side. In contrast, while the sub-regions in less populated locales also generally have a square shape, these sub-regions are typically 1.0 nautical miles per side. Therefore, in one advantageous embodiment, the resolution of the terrain database is typically 0.5 nautical miles up to 30 nautical miles from a runway and is typically 1.0 nautical miles for regions further from a runway.

As such, the ground proximity warning system 26 and method of the present invention also preferably takes into account the resolution of the terrain database at the current position of the aircraft in altering the base width of the alert envelope. In one advantageous embodiment, for example, the ground proximity warning system and method alters the base width of each alert envelope as follows:

$$\text{Base half width} > ErrorValue - \frac{DatabaseResolution}{2}$$

By reducing the base width by the resolution of the terrain database, the ground proximity warning system 26 and method of this embodiment of the present invention prevent the generation of a number of nuisance alarms that were found to be produced if the base width of the alert envelopes were instead increased by the resolution of the terrain database. While the ground proximity warning system method of the present invention reduce the base width of the alert envelopes by the resolution of the terrain database according to one advantageous embodiment, the ground proximity warning system and method cab increase the base width by the resolution of the terrain database, if so desired, without departing from the spirit and scope of the present invention.

While the processor 46 can determine the error value associated with the current position of the aircraft in a variety of different manners, the error value associated with the current position of the aircraft is typically largely dependent upon the type of navigation equipment that provides the current position of the aircraft to the ground proximity warning system 26 and, more particularly, to the processor of the look ahead warning generator 28. See, for example, block 200 of FIG. 5 which depicts the overall operations performed by a ground proximity warning system and method according to one advantageous embodiment. In this regard, a GPS system generally defines the current position of the aircraft with very little uncertainty, such as to within 0.054 nautical miles, irrespective of the phase of the flight.

In contrast, many aircraft rely upon flight management systems to define the current position of the aircraft, albeit with much greater uncertainty. In this regard, flight management systems generally receive input relating to the current position of the aircraft from one or more other navigational instruments, such as an inertial navigational instrument, a radio navigational instrument and/or a GPS system. Based upon the input from the other navigational instruments, the flight management system generates position information, including the current position of the aircraft. Since the flight management system can receive input from various types of navigational instruments, the uncertainty associated with the current position of the aircraft determined by a flight management system can be quite large depending upon the type of navigational instrument that provides the input.

For example, one common type of radio navigational instrument that provides input to a flight management system is a very high frequency omnidirectional radio range (VOR) system. While VOR systems are commonly utilized, VOR systems cannot define the position of the aircraft with great accuracy, at least in comparison to a GPS system. In addition, the accuracy with which a VOR system can define the current position of the aircraft also varies with the phase of the flight of the aircraft. In this regard, the VOR system can generally define the position of the aircraft with greater precision as the aircraft nears a runway than during the enroute phase of the flight of the aircraft.

Since the current position that is provided by flight management systems can be derived based upon input received from a variety of navigational instruments, the uncertainty of the current position provided by the flight management system is considered to be at least as great as the largest uncertainty or error value associated with the position information provided by the various navigational instruments. As such, in instances in which the current position of the aircraft is provided by a flight management system that receives input from a VOR system, the uncertainty or error value associated with the current position of the aircraft is set equal to the uncertainty or error value of the position information provided by a VOR system since the VOR system generally provides position information with the largest uncertainty.

As mentioned above, the 95% probability numbers provided by the AC 20-130 airworthiness approval of multi-sensor navigation systems for use in the U.S. national airspace system (NAS) and Alaska can be utilized to define the uncertainty or error value associated with the position information provided by a flight management system depending upon the phase of flight, i.e., enroute, terminal area or final approach. However, these uncertainties or error values significantly overstate the actual error values since they are generally based upon the standards for older navigational equipment. Instead, the guidelines of RTCA DO-236 Minimum Aviation System Performance Standards: Required Navigation Performance for Area Navigation, Appendix C—Navigation System Requirements and Infrastructure Characteristics may be referenced to define the error value associated with the position information provided by a flight management system that relies upon a VOR system. In this regard, the uncertainty or error associated with the position information discernible from a VOR system include the VOR ground error and the VOR airborne error which the above-referenced guidelines define as 0.7 degrees and 1.0 degrees, respectively. As known to those skilled in the art, the VOR ground error is attributable to the error in the radio signal transmitted from a VOR station, while the VOR airborne error is attributable to errors arising during processing of the VOR signals onboard the aircraft. Although the above-referenced guidelines define the VOR ground error to be 0.7 degrees, the ground proximity warning system 26 and method of one advantageous embodiment utilizes a VOR ground error of 1.4 degrees in order to provide a conservative estimate of the error value of the position information provided by a flight management system that relies upon a VOR system.

As also known to those skilled in the art, a VOR system can determine the bearing of the aircraft relative to a VOR station. In addition, a VOR system also generally includes distance measuring equipment (DME) onboard the aircraft to determine the distance D from the aircraft to the VOR station. As such, the error value of a flight management system that relies upon a VOR system for position information can be determined as a function of the distance D from the VOR station as follows:

$$VOR_{Error} = \sqrt{[(VORGroundError)(D)]^2 + [(VORAirborneError)(D)]^2}$$

As can be seen from the above equation, the error value of a flight management system that relates upon a VOR system therefore varies in direct proportion to the square of the distance D to the VOR station. Since a VOR station is located at or near many airports, the error values associated with the position information provided by a flight management system therefore not only vary based upon the distance to the VOR station, but also generally vary based upon the distance to a runway.

Nevertheless, the error value associated with the position information provided by a flight management system is generally larger than the error value associated with the position information provided by a GPS system. Therefore, the ground proximity warning system 26 and method of the present invention alters the base width of the alert envelope based upon the type of the navigation equipment that provides the position information. More specifically, the ground proximity warning system and method alters the base width of the alert envelope to be larger if a flight management system provides the current position of the aircraft to the ground proximity warning system than if a GPS provides the current position of the aircraft to the ground proximity warning system.

The ground proximity warning system 26 and method of the present invention could alter the base width of the alert envelope based solely upon the error value associated with the position information provided by the navigation equipment. In this regard, the ground proximity warning system and method of the present invention would preferably insure that a base half width, i.e., that portion of the base width that extends laterally to one side of the current position of the aircraft, equals or exceeds the error value associated with the position information provided by the navigation equipment, typically by at least some minimum threshold.

As described above, the ground proximity warning system 26 and method of the present invention can also take into account the resolution of the terrain database in the course of controllably altering the base width of the alert envelopes. In one advantageous embodiment described above and depicted in blocks 200–230 of FIG. 5, for example, ground proximity warning system and method alters the base width of each alert envelope as follows:

$$\text{Base half width} > ErrorValue - \frac{DatabaseResolution}{2}$$

As explained above, by reducing the base width of each alert envelope by the resolution of the terrain database, the ground proximity warning system 26 and method of the present invention prevents the generation of a number of nuisance alarms that would otherwise have been produced if the base width had been, instead, increased by the resolution of the terrain database. As also explained above, however, the ground proximity warning system and method of the present invention may increase the base width by the resolution of the terrain database, if so desired, without departing from the spirit and scope of the present invention.

In one embodiment in which the resolution of the terrain database is 0.5 nautical miles up to a distance of 30 nautical miles from the runway and is thereafter 1.0 nautical miles, the ground proximity warning system 26 and method defines the base half width of each alert envelope at a number of distances from the runway for respective error values of the VOR-based flight management system as follows:

| Distance to Runway (nm) | FMS Error Value (nm) | 50% of the Database Resolution (nm) | Base Half Width (nm) |
|---|---|---|---|
| 10 | 0.324 | 0.25 | 0.08 |
| 15 | 0.491 | 0.25 | 0.241 |
| 20 | 0.653 | 0.25 | 0.403 |
| 25 | 0.815 | 0.25 | 0.565 |
| 30 | 0.977 | 0.25 | 0.727 |
| 40 | 1.302 | 0.5 | 0.802 |
| 50 | 1.627 | 0.5 | 1.127 |

As depicted, the error value of the flight management system increases as the aircraft is further removed from the runway. As such, the ground proximity warning system 26 and method of the present invention also serves to alter the base width of each alert envelope based, in part, upon the distance of the aircraft to the runway.

While the ground proximity warning system 26 and method can be configured to alter the base width of each alert envelope as described above, the ground proximity warning system and method can also be somewhat simplified by defining a relationship, such as a stair-step like relationship between the base width of each alert envelope and the distance of the aircraft to the selected runway. In this regard, one advantageous technique for determining the distance to the selected runway actually determines a corrected distance to a selected runway as described by U.S. patent application Ser. No. 09/494,630 entitled "Methods, Apparatus And Computer Program Products For Determining Corrected Distance Between An Aircraft And A Selected Runway" filed Feb. 1, 2000, the contents of which are incorporated herein by reference.

Figure 4:
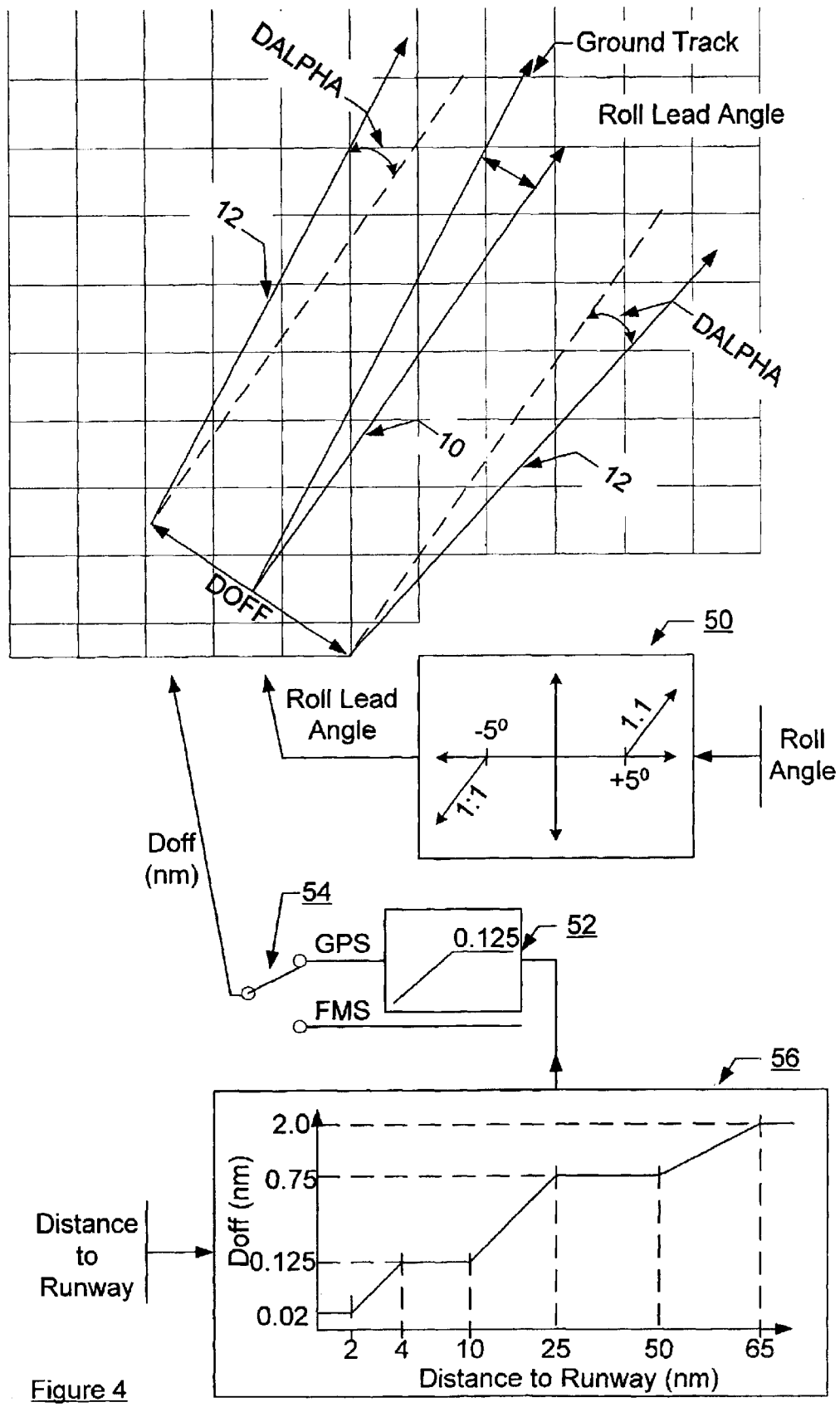
FIG. 4 is a graphical representation of the operations performed by the processor of a ground proximity warning system according to one embodiment of the present invention.

In this regard, FIG. 4 depicts the operations performed by a ground proximity warning system 26 and method according to this embodiment in which the relationship between the base width of each alert envelope and the distance to an intended runway is graphically depicted at 50. As will be apparent from this graphical representation, the base width of each alert envelope at a particular distance from the runway approximates the base width of the alert envelope that is otherwise mathematically determined from the relationship between base half width, the error value and the database resolution.

In operation, the processor 46 of the ground proximity warning system 26 of this embodiment determines the base width of each alert envelope based upon a numerical representation of the graphical relationship between the distance to the runway and the base width of the alert envelopes depicted at 50. Typically, the numerical representation is stored in the memory device 40, although the numerical representation can be stored elsewhere, such as within the processor, if so desired. The processor also conditions the adjustment of the base width upon the type of navigation equipment that is providing the position information as schematically depicted by the switch 54 in FIG. 4. If a flight management system is providing the position information, the ground proximity warning system and method determines the distance to the runway and the corresponding base width is then determined based upon the previously defined relationship, which is depicted graphically by FIG. 4. If, however, a GPS system is providing the position information to the ground proximity warning system and method, the ground proximity warning system and method again determines the base width of each alert envelope based upon the relationship defined between the base width and the distance of the aircraft to the intended runway. As shown in block 52, however, the ground proximity warning system and method includes a limiter that limits the base width of each alert envelope to a predetermined maximum value, such as 0.125 nautical miles, in recognition that the positioning information provided by a GPS system is quite accurate relative to a flight management system and is largely independent of the distance of the aircraft from a runway, i.e., the error value of the position information provided by a GPS system is relatively constant at all distances from an intended runway. As such, the base width of the alert envelopes constructed by a ground proximity warning system and method that receives position information from a GPS system linearly varies between a lower limit of 0.02 nautical miles and an upper limit of 0.125 nautical miles as the aircraft goes from 2 nautical miles to 4 nautical miles from a runway.

Although the center tine 10 of the alert envelope depicted in FIG. 2 is shown to extend colinearly with the ground track of the aircraft, the ground proximity warning system 26 and method can angularly offset the center tine from the ground track in instances in which the aircraft is turning. In this regard, the ground proximity warning system and method generally receive a signal indicative of the roll angle of the aircraft from the navigational equipment, such as a flight management system. See block 240 of FIG. 5. Since the alert envelopes are generally only rotated relative to the ground track of the aircraft for larger roll angles, such as roll angles greater than 5 degrees, the ground proximity warning system and method preferably includes a filter 56 that filters the roll angle of the aircraft such that those roll angles having an absolute value of less than 5 degrees are set equal to zero and the center tine of each alert envelope will remain colinear with the ground track of the aircraft. See blocks 250 and 260 of FIG. 5. However, in instances in which the roll angle of the aircraft is relatively large, such as roll angles having an absolute value greater than 5 degrees, an angle related to the roll angle is provided to the ground proximity warning system and method in order to correspondingly rotate the center tine of each alert envelope relative to the ground track of the aircraft. In one embodiment depicted in FIG. 4 and blocks 250, 270 and 280 of FIG. 5, for example, an angular value that is reduced in magnitude by 5 degrees relative to the roll angle is provided to the ground proximity warning system and method to define the angular offset of the center tine of each alert envelope relative to the ground track of the aircraft. Thus, for an aircraft having a roll angle of 7 degrees, the center tine of each alert envelope will be rotated by 2 degrees relative to the ground track of the aircraft. Additionally, turning of the aircraft in which the right wing of the aircraft is lower than the left wing of the aircraft creates a positive roll angle which, in turn, causes the center tine of each alert envelope to rotate clockwise relative to the ground track of the aircraft. In contrast, turning of the aircraft in which the left wing of the aircraft is lower than the right wing of the aircraft creates a negative roll angle which, in turn, causes the center tine of each alert envelope to rotate counterclockwise relative to the ground track of the aircraft. One example of an alert envelope that has been constructed about a center tine that has been rotated counterclockwise relative to the ground track of the aircraft is depicted in FIG. 4.

In addition to a ground proximity warning system 26 and method, a computer program product is also provided according to the present invention for controllably altering the base width of an alert envelope, such as based upon an error value associated with the current position of the aircraft. The computer program product has a computer readable storage medium having computer readable program code means embodied in the medium. With reference to FIG. 3, the computer readable storage medium may be part of the memory device 40, and the processor 46 of the present invention may implement the computer readable program code means to a controllably alter the base width of an alert envelope, as described in the various embodiments above.

The computer readable program code means includes first computer instructions means for generating an alert envelope that defines an alert region extending at least forward of an aircraft. In this regard, the first computer instruction means defines the alert envelope based at least partially upon a base width proximate the current position of the aircraft and extending laterally relative to the aircraft and a look ahead distance extending forward of the aircraft. According to the present invention, the first computer instruction means alters the base width of the alert envelope depending upon an error value associated with the current position of the aircraft. More specifically, the first computer instruction means alters the base width of the alert envelope to be smaller if the error value associated with the current position of the aircraft decreases and, conversely, alters the base width of the alert envelope to be larger as the error value associated with the current position of the aircraft increases. As described above, the first computer instruction means can also alter the base width of the alert envelope based upon the resolution of the terrain database of the current position of the aircraft. For example, the first computer instruction means can alter the base width of the alert envelope to be at least as large as the difference between the error value associated with the current position of the aircraft and 50% of the resolution of the terrain database at the current position of the aircraft.

As described above, the error value associated with the current position of the aircraft is typically dependent upon the type of navigation equipment that provides the position information. As such, the first computer instruction means preferably alters the base width of the alert envelope based upon the type of navigation equipment that provides the current position of the aircraft. For example, the first computer instruction means can alter the base width of the alert envelope to be larger if a flight management system provides the current position of the aircraft than if a GPS system provides the current position of the aircraft. In this exemplary embodiment, the first computer instruction means can also limit the base width of the alert envelope to a predetermined maximum value if a GPS system is providing the current position of the aircraft since the position information provided by a GPS is generally quite accurate and does not generally change significantly as the distance between the aircraft and an intended runway changes.

Figure 5:
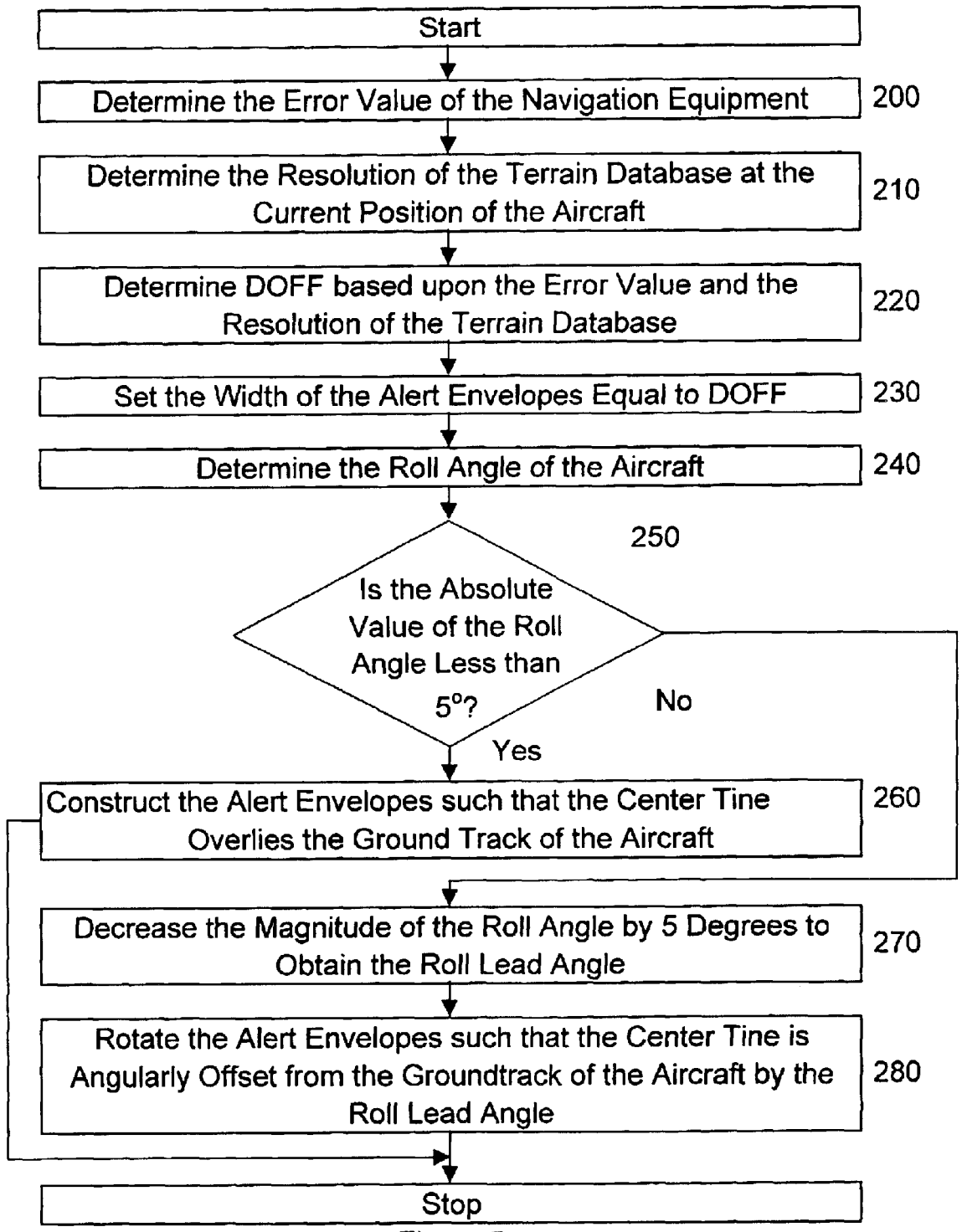
FIG. 5 is a flow diagram illustrating the operations performed by a ground proximity warning system and method according to one embodiment of the present invention.

In this regard, FIGS. 3–5 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Therefore, the ground proximity warning system 26, method and computer program product of the present invention controllably alter the base width of the alert envelope in order to compensate for errors associated with the current position of the aircraft, such as the errors that are dependent upon the type of navigation equipment that provides the current position of the aircraft and/or the distance of the aircraft to the intended runway. In addition, the ground proximity warning system, method and computer program product of one embodiment of the present invention also alter the base width of the alert envelope based upon the resolution of the terrain database at the current position of the aircraft. Accordingly, the ground proximity warning system, method and computer program product ensure that alerts provided by the ground proximity warning system in response to terrain or other obstacles penetrating the alert envelope are provided sufficiently far in advance of the terrain or other obstacles such that the pilot has an ample opportunity to assess the situation and take proper evasive action, even in instances in which the aircraft is actually displaced from the current position identified by the navigation equipment in a direction toward the upcoming terrain or other obstacles.

Many modifications and other embodiments of the invention will come to mind to one skilled in the art to which this invention pertains having the benefit of the teachings presented in the foregoing descriptions and the associated drawings. For example, the preferred embodiment has been described in terms of an aircraft application, but those of skill in the art will recognize that the invention can be applied to marine applications when the turn lead characteristics of the ship are substituted for roll angle. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A ground proximity warning system configured to receive data from a plurality of navigation systems, the navigation systems configured to provide a current position of the craft, the ground proximity warning system comprising:

a processor for generating an alert envelope that defines an alert region extending at least forward of a craft, said processor defining the alert envelope based at least partially upon a base width proximate a current position of the craft and extending laterally relative to the craft and a look ahead distance extending forward of the craft, said processor altering the base width of the alert envelope depending upon which of the plurality of navigation equipment provides the current position of the craft to the ground proximity warning system.

2. A ground proximity warning system according to claim 1 that is responsive to a terrain database having a plurality of different resolutions, wherein said processor also alters the base width of the alert envelope based upon the resolution of the terrain database at the current position of the craft.

3. A method for providing ground proximity warnings based upon data from one of a plurality of navigation equipment systems comprising generating an alert envelope that defines an alert region extending at least forward of a craft, wherein generating the alert envelope comprises defining the alert envelope based at least partially upon a base width proximate a current position of the craft and extending laterally relative to the craft and a look ahead distance extending forward of the craft, and wherein defining the alert envelope comprises altering the base width of the alert envelope depending upon which of a plurality of navigation equipment systems is providing the current position of the craft.

4. A method according to claim 3 further comprising accessing a terrain database having a plurality of different resolutions and determining if terrain represented by the terrain database penetrates the alert envelope, wherein altering the base width of the alert envelope comprises altering the base width of the envelope based upon the resolution of the terrain database at the current position of the craft.

5. A computer program product for providing ground proximity warnings based upon data provided from one of a plurality of navigation systems, wherein the computer program product comprises a computer readable storage medium having computer readable program code means embodied in said medium, said computer readable program code means comprising first computer instruction means for generating an alert envelope that defines an alert region extending at least forward of a craft, wherein said first computer instruction means defines the alert envelope based at least partially upon a base width proximate a current position of the craft and extending laterally relative to the craft and a look ahead distance extending forward of the craft, and wherein said first computer instruction means alters the base width of the alert envelope depending upon which of a plurality of navigation equipment systems is providing the current position of the craft.

6. A computer program product according to claim 5 that is responsive to a terrain database having a plurality of different resolutions, wherein said first computer instruction means alters the base width of the envelope based upon the resolution of the terrain database at the current position of the craft.

* * * * *